United States Patent [19]
Herbert

[11] 4,008,645
[45] Feb. 22, 1977

[54] AIRCRAFT SUPPORTED LAUNCHABLE WEAPON RELEASE ASSEMBLY

[76] Inventor: Donald H. Herbert, 1350 9th St., San Pedro, Calif. 90732

[22] Filed: Mar. 22, 1974

[21] Appl. No.: 453,827

[52] U.S. Cl. .............................. 89/1.5 R; 89/1.5 G; 244/137 R
[51] Int. Cl.² ......................................... F41F 5/02
[58] Field of Search ............ 89/1.5 R, 1.5 A, 1.5 B, 89/1.5 C, 1.5 G, 1.5 F; 294/83 R, 83 A, 83 AA, 83 AB; 244/137

[56] References Cited
UNITED STATES PATENTS

| | | | |
|---|---|---|---|
| 2,756,091 | 7/1956 | Komerska | 294/83 AB |
| 3,006,253 | 10/1961 | Parot | 89/1.5 R |
| 3,008,376 | 11/1961 | Brunow et al. | 89/1.5 |
| 3,266,834 | 8/1966 | Lebovitz | 89/1.5 R |
| 3,273,459 | 9/1966 | Lardin | 244/137 R |
| 3,610,094 | 10/1971 | Graigie | 89/1.5 F |

*Primary Examiner*—Samuel W. Engle
*Assistant Examiner*—S. A. Cangialosi
*Attorney, Agent, or Firm*—William C. Babcock

[57] ABSTRACT

The weapon release assembly includes an articulate structure capable of being mounted at a desired position on an aircraft to triaxially support and restrain movement of a launchable weapon relative to the aircraft, until it is desired to launch the weapon. When the assembly is actuated to launch the weapon, the weapon is moved outwardly along a path normal to the longitudinal axis of the aircraft to a desired position where it is released from the system at a desired velocity. Operation of the assembly may be by either hot or cold gas. All forces arising from use of the assembly in supporting the weapon and launching the latter are transmitted directly to the aircraft on which the assembly is mounted. The assembly by buffering the actuating gas, is susceptible to being used to launch weapons of various weights at the same terminal velocity without adjustments or corrections being made to the assembly. Preloading of weapon on the assembly may be accomplished either manually or automatically.

11 Claims, 29 Drawing Figures

AIRCRAFT SUPPORTED LAUNCHABLE WEAPON RELEASE ASSEMBLY

BACKGROUND OF THE INVENTION

1. Field of the Invention

Aircraft supported launchable weapon release assembly.

2. Description of the Prior Art

In the past, numerous systems have been devised and used in launching weapons from an aircraft. Such prior systems have had numerous operational disadvantages, such as being unduly heavy, bulky and cumbersome; launching a weapon so close to an aircraft that turbulent air currents of high intensity batter the weapon and throw it off course; require an undue amount of physical effort and time to preload a weapon into pressure contact with a supporting sway brace; and launching weapons of different weights at different terminal velocities in paths not normal to the longitudinal axis of the aircraft.

The primary object in devising the present invention is to supply an aircraft supported weapon release assembly that is compact, relatively light in weight, is simple and easy to use, and one that overcomes the operational disadvantages of prior art systems.

Another object of the invention is to furnish a weapon release assembly in which the weapon is positively locked in the articulate structure that forms a part of the assembly, and so remains until such time that the assembly is actuated to move the triaxially restrained weapon outwardly at a desired velocity relative to the aircraft to a desired position where the weapon is released and launched.

A still further object of the invention is to provide a weapon release assembly that may be energized equally well by either high pressure cold gas or isothermal expansion of a charge of hot gas, may be used successfully on either high or low speed aircrafts, and the assembly being of such design that all inertia and aerodynamic forces arising from use thereof are transmitted directly to the supporting aircraft.

Another object of the invention is to supply a weapon release assembly in which a standard ballistic curve of hot isothermally exploding gas and a dimensionally corrolated articulate structure cooperate to provide a substantially flat output curve to eject a weapon from a supporting aircraft at a desired velocity.

Yet another object of the invention is to supply a weapon release system which by the use of buffered gas is self correcting to launch weapons of various weights at uniform velocities, and without the system requiring adjustment or correction to achieve such weapon launching.

Another object of the invention is to provide a weapon release system in which the weapon is automatically preloaded into a desired pressure contact with the sway braces that form a part of the system.

SUMMARY OF THE INVENTION

The weapon support assembly is capable of being mounted in a desired position on an aircraft to support a launchable weapon in a triaxially restrained position, and to so maintain the weapon until a portion of the assembly is moved outwardly from the aircraft in a path normal to the longitudinal axis of the latter to a desired position where the weapon is released at a desired velocity. The assembly includes an elongate housing secured to a selected portion of the aircraft and parallel to the longitudinal axis thereof.

The housing has an elongate rigid rod slidably supported therein for longitudinal movement relative to the housing, with the rod having first and second end portions. Two longitudinally spaced sets of first and second arms are included as a part of the assembly, with each of the arms having first and second end portions. First means are included as a part of the assembly for pivotally connecting the first end portions of the first arms to the housing, first end portions of the second arms to opposite end portions of the rods, and second end portions of the first arms to the second arms intermediate the first and second end portions of the latter, with the first and second arms being of such relative length that when the rod is moved longitudinally in the housing, the second end portions of the second arm move outwardly in a straight path normal to longitudinal axis of the aircraft.

In a first form of the system, two sway braces are provided that are pivotally supported from the second end portions of the second arms, with the sway braces having openings therein through which the supporting lugs of the weapon extend upwardly. Two spring loaded, cam controlled hooks are pivotally supported from the second end portions of the second arms, which hooks removably engage openings formed in the lugs to support the weapons from the assembly until such time that the sets of first and second arms are caused to swing outwardly to a maximum outward position relative to the aircraft whereupon the hooks due to the action of the cam and springs automatically assume positions where they are disengaged from the lugs and the weapon is launched.

The first form of the invention also includes second means for preloading the weapon into desired pressure contact with the sway brace. Pressurized fluid means are provided for moving the rod forwardly relative to the aircraft to force the first and second arms to complete the maximum outward swing above mentioned, with the weapons as this swing is completed, moving in a path normal to the longitudinal axis of the aircraft, and the weapon at completion of the outward swing of the arms, moving away from the aircraft at a desired velocity.

A third means is provided for releasably holding the rod in a fixed longitudinal position relative to the housing prior to the assembly being actuated to launch the weapons. Fourth means are also provided for automatically actuating the third means to release the rod when the pressurized fluid is permitted to exert a longitudinal force on the rod to move the latter.

Hand operated means are also provided as a part of the first form of the invention for disengaging the lugs from the hooks without using pressurized fluid to move the sets of first and second arms.

Second and third forms of the weapon release assembly are shown in the drawings and hereinafter described in which the weapons is weapon preloaded into pressure contact with sway braces at the time the weapon is loaded onto the assembly. The second and third forms of the invention are particularly adapted for use with launchable weapons having the lugs longitudinally spaced from one another by a distance of 14 inches and 30 inches respectively.

DESCRIPTION OF THE PREFERRED EMBODIMENT

The weapon release assembly A is shown generally in FIGS. 1 to 6 inclusive. A first form A-1 of the assembly is illustrated in FIGS. 7 to 14 inclusive; a second form A-2 in FIGS. 15 to 22 inclusive; and a third form A-3 in FIGS. 23 to 27 inclusive.

The major element of the weapon release assembly A as shown in FIGS. 1 to 6 inclusive are an elongate rod B that has a piston C mounted intermediate the ends thereof. The rod B and piston C are slidably supported for longitudinal movement in an elongate cylinder D that occupies a fixed position relative an aircraft E and parallel to the longitudinal axis F of the latter.

Two sets of first and second arms G and H are provided, with first end portions of the first and second arms of each set pivotally connected in fixed relationship to the body of the aircraft and the rod respectively. Second end portions of the second rods H support first means J that removably engage and support suitable lugs on the launchable weapon K.

Figure 1:
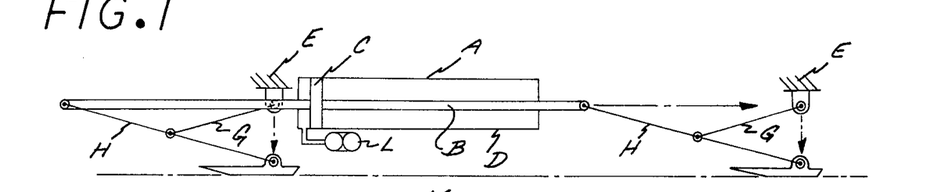
FIG. 1 is discharge therefrom when the second arms have diagrammatic view of the general arrangement of the weapon release assembly in a weapon transporting position, which assembly includes a pressurized fluid actuated system that moves a rod longitudinally to pivot two sets of first and second arms outwardly, and the extremities of the second arms releasably supporting the weapon for discharge completed their maximum outward swing.
Figure 2:
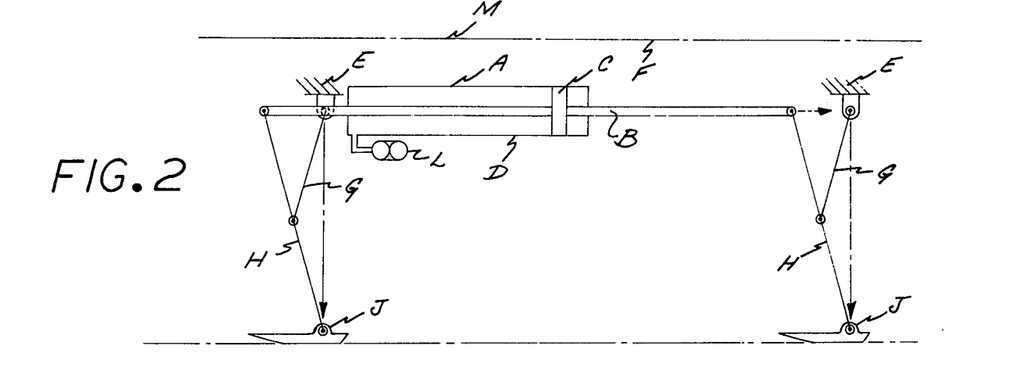
FIG. 2 is the same diagrammatic figure as shown in FIG. 1, but with the two sets of first and second arms having been pivoted outwardly by movement of the rod and piston to positions where the weapon supported from the outer extremities of the second arms is discharged therefrom, and with the outer ends of the second arms in so swinging moving in paths that are normal to the longitudinal axis of the aircraft.
Figure 3:
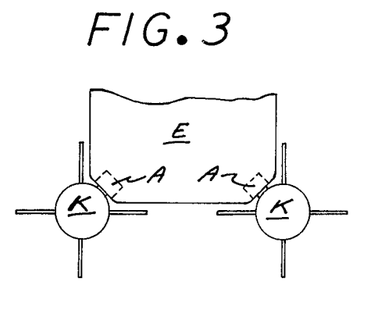
FIG. 3 is an end elevational view of a portion of an aircraft with two of the assemblies holding weapons in transporting positions.
Figure 4:
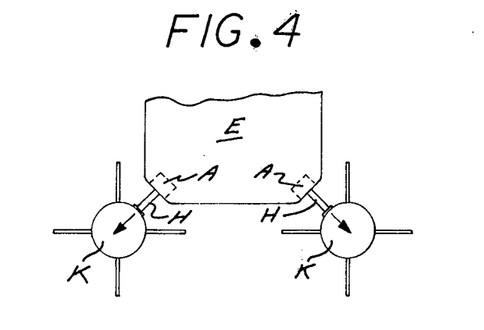
FIG. 4 is the same view as shown in FIG. 3, but after the assemblies have been actuated to move the weapons outwardly to a desired position relative to the aircraft where the weapons are launched.
Figure 5:
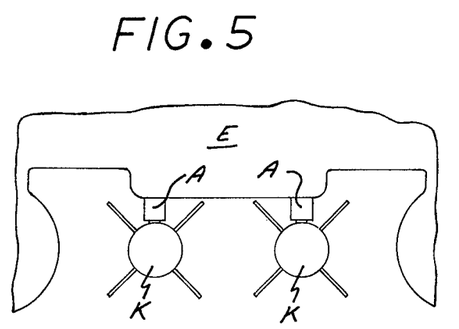
FIG. 5 is another end elevational view of an aircraft showing two of the weapon release assemblies mounted thereon and supporting weapons in transporting positions.
Figure 6:
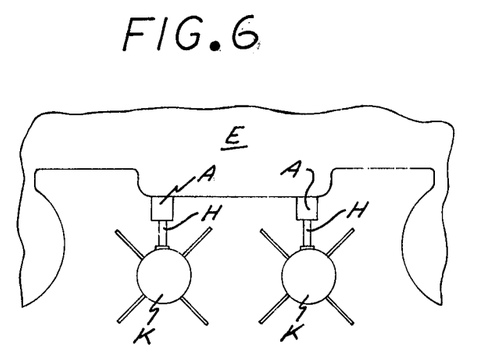
FIG. 6 is the same view as shown in FIG. 5, but after the weapon release assemblies have been actuated to move the weapon outwardly from the aircraft to a launching position.

The first means J automatically release the weapon K when the second arms H have pivoted outwardly from the first positions illustrated in FIG. 1 to the second positions illustrated in FIG. 2. Second end portions of the first arms G are pivotally connected to the second arms H intermediate the first and second end portions of the latter.

The weapon release system A is actuated by either hot or cold gas discharged into cylinder D from a controlled source L of the gas. The sets of first and second arms G and H are so dimensionally related to one another and to the rod B that when the assembly A is actuated, the weapon K is moved outwardly relative to the aircraft in a path that is normal to the longitudinal axis F as shown by the arrow in phantom line L in FIG. 2.

The first form A-1 of the invention is shown in structural detail in FIGS. 7 to 14 inclusive. The first form A-1 as may be seen in these figures includes a housing 10 that is defined by end pieces 12, side pieces 14, top 16, and bottom 18. The housing 10 as may be seen in FIG. 8 also includes a number of transverse reinforcing members 20. The end pieces 12 as may be seen in FIG. 8 have lugs 22 extending outwardly therefrom in which bores 24 are formed, to permit bolts (not shown) to be extended therethrough to a desired body portion of the aircraft E. Elements in the invention A shown in FIGS. 1 to 6 that are common to the first form A-1 are identified by the same letters previously used, but with 1 being affixed thereto.

Figures 8, 9:
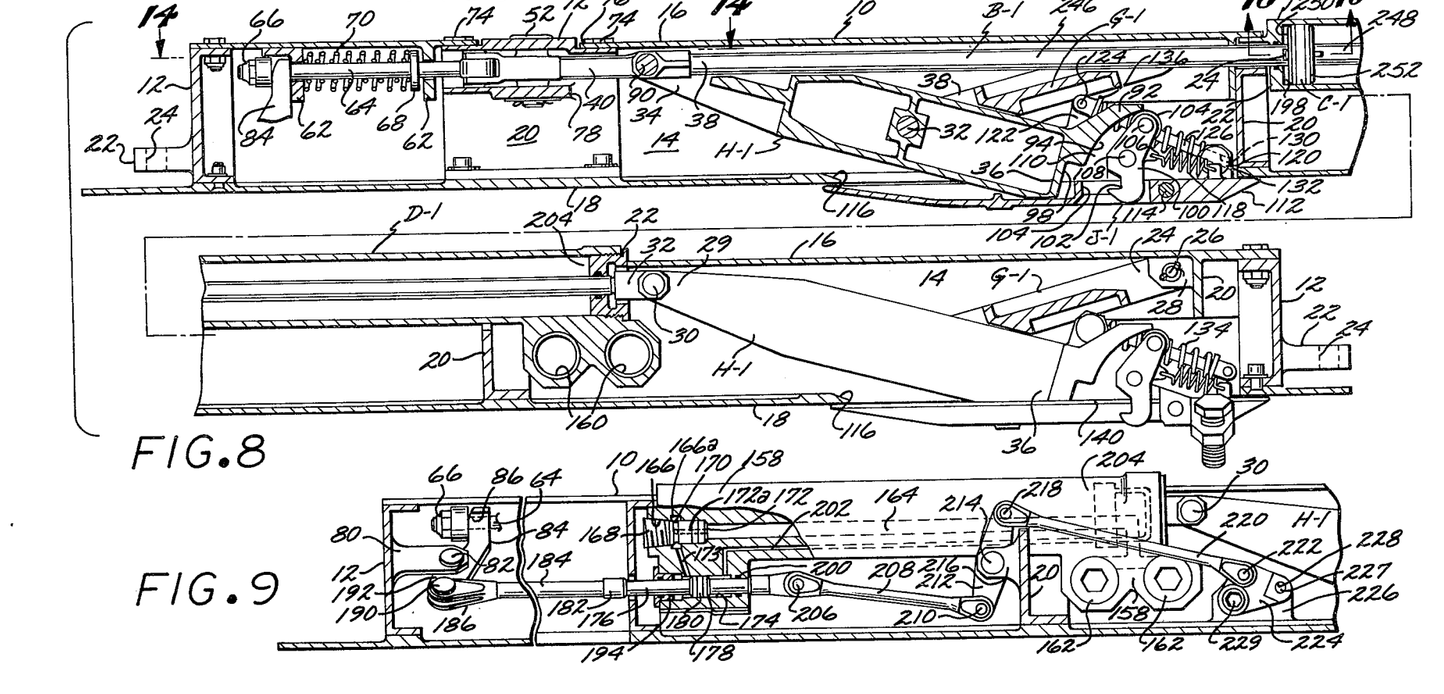
FIG. 8 is a longitudinal cross sectional view of the first form of the invention taken on the line 8—8 of FIG. 7.
FIG. 9 is a longitudinal cross sectional view of the rearward portion of a first form of the invention.

In FIG. 8 it will be seen that the elongate cylinder D-1 is by conventional means secured in a fixed position to the housing 10 and extends longitudinally relative thereto. The rod B-1 is slidably and sealingly supported in end pieces 22 of the cylinder D-1. Piston C-1 as shown in FIG. 8 is removably secured to the rod B-1 in a fixed longitudinal position thereon by suitable conventional securing means (not shown). The first and second arms G-1 and H-1 in the two sets thereof as may be seen in FIG. 8 are formed with a transversely ribbed configuration for lightness and strength, with the first end portions 24 of the first arms G-1 being pivotally supported by transverse rods 26 that extend between a pair of laterally spaced lugs 28 that are secured to the interior of the housing 10.

The forwardly disposed one of the second arms H-1 as may be seen in FIG. 8 has the first end portion 29 pivotally secured by a pin 30 to an end member 32 that is affixed to the forward end of the rod D-1. Each second arm H-1 has a transverse pin 32 supported thereon intermediate the first end portion 34 and second end portion 36 of the second arm, and the pin 32 pivotally engaging the second end portion 38 of the first arm G-1. The rearward end of the rod B-1 engages a ribbed structure 40 best seen in FIG. 14, which rib structure has a transverse shaft (not shown) extending therethrough on which a pair of laterally spaced rollers 42 are mounted, and these rollers resting on a pair of laterally spaced rails 44 secured to the interior surfaces of the side walls 14.

Figure 14:
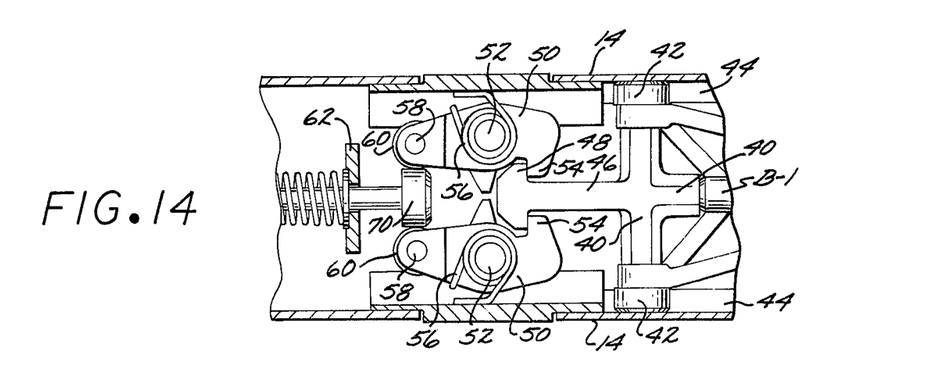
FIG. 14 is a fragmentary top plan view of a rearward portion of the first form of the invention taken on the line 14—14 of FIG. 8.

The ribbed structure 40 includes a rearwardly extending shank 46. Shank 46 on the rearward end develops into an engageable member 48 of substantially greater transverse cross section as best seen in FIG. 14. Two elongate laterally spaced members 50 are pivotally supported on vertically extending pins 52 that occupy fixed position relative to the housing 10, and the members 50 defining hooks 54 that are urged into engagement with the engageable member 48 by springs 56.

The rearward portions of the members 50 support vertically disposed shafts 58 on which rollers 60 are rotatably supported. Two lugs 62 depend from the top 16 as may be seen in FIG. 8 slidably support a bar 64 of circular transverse cross section that has a rearward threaded end on which a nut 66 is mounted. The bar 64 has a collar 68 mounted on the forward portion thereof as shown in FIG. 8. A helical spring 70 that is in compression extends between the rearwardly disposed lug and the collar 68 to at all times urge the bar 64 forwardly.

The bar 64 on its forward end supports a head 70 of enlarged transverse cross section that is illustrated as being disposed between the rollers 60 to maintain the hooks 54 in engagement with the engageable member 48. When the hooks 54 and engageable members 48 are in engagement it will be apparent that no forward movement of rod B-1 may take place relative to the housing 10, the importance of which will later become apparent. A first plate 72 is removably secured by screws 74 or other suitable fastening means to span an opening 76 defined in the top 16 as seen in FIG. 8. A second plate 78 extends outwardly from one of the reinforcing members 20 as shown in FIG. 8 and is situated at a substantial distance below the first plate 72. The shafts 52, which may be bolts, extend through vertically aligned openings (not shown) formed in the plates 72 and 78. A lug 80 as can best be seen in FIG. 9 extends forwardly from the rearward end piece 12, and supports a pin 82 on which a lever 84 is pivotally supported. The lever 84 has a transverse bore 86 extending therethrough that engages the rearward end of the bar 64. The upper end of lever 84 is disposed between the most rearwardly disposed member 62 and the nut 66 as shown in FIGS. 8 and 9.

The second end portions 36 of each of the second arms H-1 has an extension 92 projecting outwardly at an angle therefrom as may best be seen in FIG. 8, which extension defines a curved cam face 94, and the extension and end portion 36 cooperating to define a recess 98. Each second arm H-1 has an elongate member 100 associated therewith, which member on a first end portion thereof defines a hook 102, and each member on a second end portion rotatably supports a roller 104 from a transversely positioned shaft 106. Each member 100 is pivotally supported on a transverse shaft 108 that extends between two transversely positioned plates 96, one of which plates may be seen in FIG. 11. Plates 96 extend outwardly from the second end portion 36.

The extension 92 above described, as well as the hook defining member 100, form the first means J-1 in the first form A-1 of the invention.

Figures 10, 11:
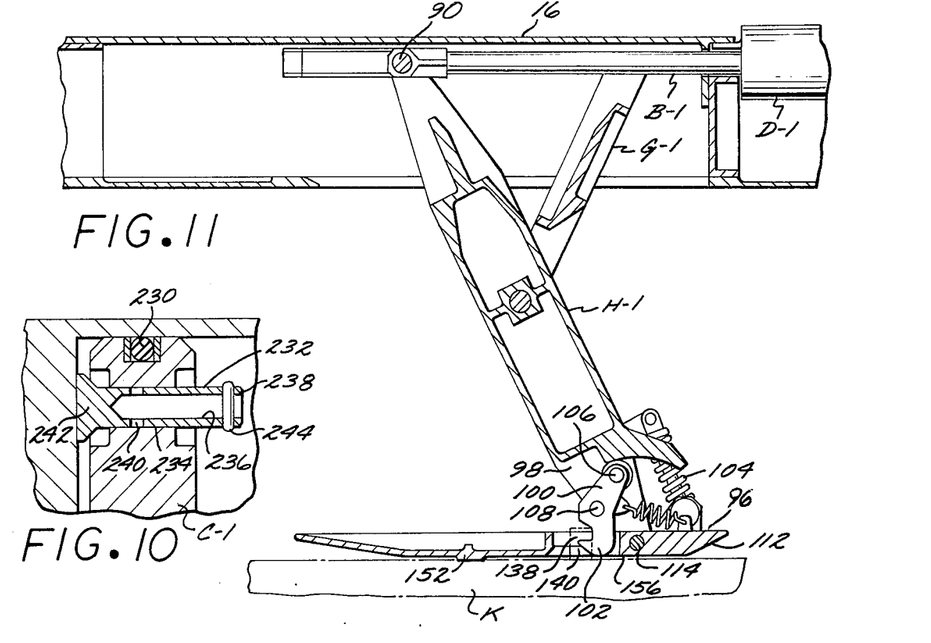
FIG. 10 is a fragmentary longitudinal cross sectional view of the actuating piston.
FIG. 11 is a combined elevational and longitudinal cross sectional view of a rearward portion of the first form of the invention.

Each second arm H-1 has an elongate sway brace 112 associated therewith as shown in FIG. 8, with each sway brace being pivotally supported on a transverse pin 114 that extends between the plate 96 as shown in FIG. 11. The bottom 18 is best seen in FIG. 8, has two longitudinally spaced openings 116 therein, with each opening being of sufficient width and length as to permit a second arm H-1 to pivot downwardly therethrough as shown in FIG. 11.

In FIG. 8 it will be seen that member 100 has a tensioned spring 118 so secured thereto that the spring at all times tends to pivot the member in a clockwise direction. The forward ends to each of the springs 118 is secured to a lug 120 that extends upwardly from a forward end of the sway brace 112. Each second end portion 36 as shown in FIG. 8 has a lug 122 extending upwardly therefrom that supports a shaft 124 that is pivotally connected to a rod 126, that has the forward end portion thereof slidably disposed in a transverse bore 130 formed in a transverse cylindrical body 132 that is rotatably supported on one of the sway braces 112.

A compressed helical spring 134 encircles each rod 126, and has the ends thereof in abutting contact with the body 132 and a collar 136 formed on the rearward portion of the rod 126. Each spring 134 at all times tends to pivot the sway brace 112 associated therewith to a position where the sway brace is in contact with the second end portion 36 of one of the second legs H-1 as shown in FIG. 8.

Figure 7:
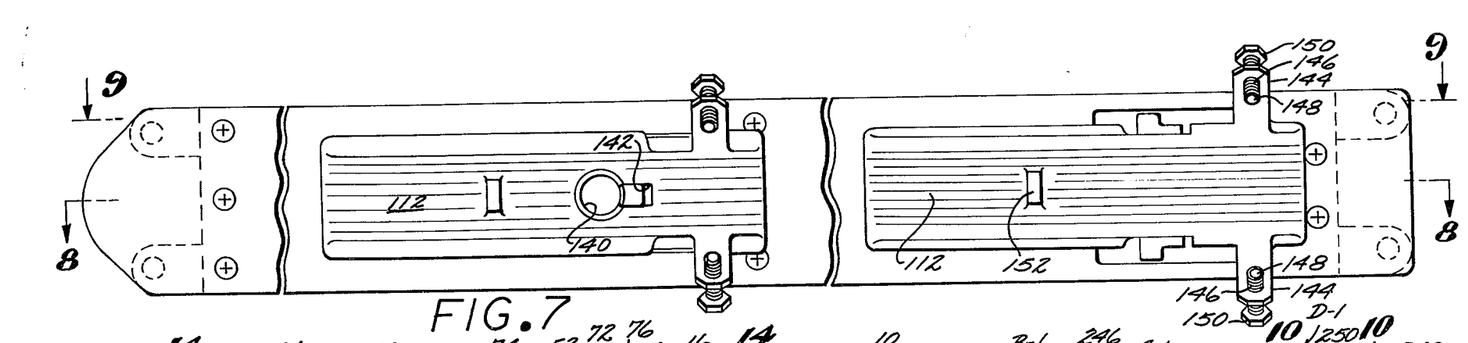
FIG. 7 is a bottom plan view of the first form of the invention.
Figure 12:
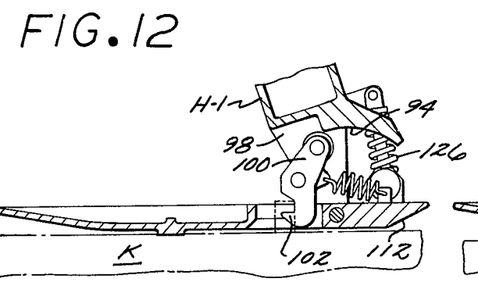
FIGS. 12 and 13 are fragmentary cross sectional views of the outer portions of one of the second arms, and illustrating the movement of a spring loaded, cam controlled hook as the latter moves to release a lug of a weapon that is in engagement therewith.
Figure 13:
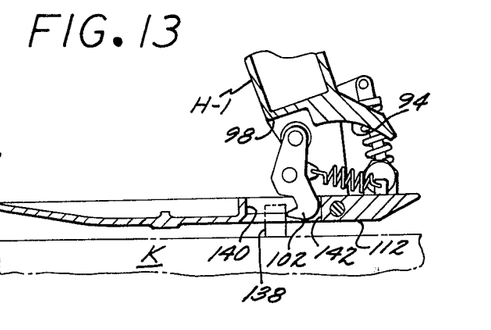

Each of the weapons K has two longitudinally spaced supporting lugs 138 extending upwardly therefrom, one of which is shown in FIG. 11. Lugs 138 are of such size as to pass upwardly through openings 140 formed in the sway braces 112. Each opening 140 has a narrow extension 142 that extends forwardly therefrom as shown in FIG. 7. In FIG. 13 it will be seen that the hook defining member 100 may be pivoted to have the hook 102 thereof positioned in the extension 142 when a second arm H-1 is pivoted downwardly to its lowermost position. The hook defining member 100 when so disposed is in a position to either release one of the lugs 138 of a launchable weapon K, or to have the lug 138 initially engaged by the hook 102 when the member 100 has moved to the position shown in FIG. 13. Each of the sway braces 112 as shown in FIG. 7 has two legs 144 in the forward portion thereof that extend outwardly in opposite directions. Legs 144 have tapped bores 146 therein that are engaged by threaded rods 148 that have heads 150 on the outer ends thereof for turning the rods. After a weapon K has the lugs 138 thereof engaged by the hooks 102 of the members 100 as shown in FIG. 12, the heads 150 are manually rotated to bring the lower ends of the threaded rods 148 into pressure contact with the exterior surface of the weapon to preload the weapon K to a desired degree relative to the sway brace. Each of the sway braces 112 includes downwardly projecting lugs 152 that engages the exterior surface of a weapon K, to maintain the exterior surface substantially parallel to the bottom face portion 156 of a sway brace 112 as shown in FIG. 11.

The housing 10 as may be seen in FIG. 9 rigidly supports an elongate body 158 that has a pair of transverse longitudinally spaced cavities 160 defined therein in which gas generating cartridges (not shown) may be disposed, and the cavities being sealed by covers 162. The two cavities 160 are in communication with a gas conducting passage 164 that extends rearwardly in the body 158 to terminate in a tapped opening 166 that is removably engaged by a plug 168. The plug 168 has a centrally disposed transverse recess 170 therein that is in communication with a longitudinal bore 172 formed in the plug, as well as a second passage 173 formed in body 158 that extends to an elongate bore 174 best seen in FIG. 9. The bore 174 is slidably engaged by a first elongate member 176 of circular transverse cross section that supports a piston 178 at an intermediate position thereon, with the piston supporting a resilient ring 180 that is in sealing contact with the interior surface of the bore 174. The first member 176 by a coupling 182 is connected to a second elongate member 184 that extends rearwardly to develop into a bifurcated end 186 that by a transverse pin 190 is connected to an end 192 of lever 84 that is most remote from the rod 64. The bore 174 as best seen in FIG. 9 has the rear end thereof closed by a plug and sealing ring assembly 194 in which the first member 176 is slidably mounted. The tapped opening 166 includes a centrally disposed, enlarged portion 166a that is in communication at all times with the rearward internal end portion 198 of cylinder D-1 as shown in FIG. 7. The forward portion of the bore 174 is closed by a sealing ring 200 that is in contact with the first member 176. The forward portion of the bore 174 rearwardly of the sealing rings 200 is in communication with a fluid passage 202 that extends to the forward end portion 204 of the cylinder D-1 as shown in FIGS. 8 and 9.

The forward end of the first member 176 is by a transverse pin 206 connected to the rearward end of a third elongate member 208, which member on its forward end is pivotally connected by a pin 210 to an end portion of a lever 212. The lever at substantially the center is pivotally supported by a pin or bolt 214 that is held in a fixed transverse position by a bracket 216 secured to one of the transverse reinforcing members 20 as shown in FIG. 9. Lever 212 is connected by a pin 218 to a fourth elongate member 220.

The fourth member 220 is by a pin 222 pivotally connected to a plate 224 that is rotatably mounted in a vertical position on a second bracket 226 that extends upwardly from the bottom 18 of the housing, and the plate and bracket having transversely alignable bores 228 formed therein. The bores 228 when the aircraft is not in flight are engaged by a safety pin 227, to prevent inadvertent actuation of the first form A-1 of the invention to launch a weapon K supported thereby.

The weapon K is preloaded into transportable contact with the sway brace 156 by extending the lugs 138 upwardly therethrough and then concurrently pivoting the second arms H-1 upwardly to cause the cam faces 94 to move from the position shown in FIG. 12 to that illustrated in FIG. 13, with upward movement of the first arms H-1 and second arms G-1 resulting in the form A-1 having the configuration shown in FIG. 7.

Prior to the sway brace 112 and weapon K being moved upwardly to the transporting position as shown in FIG. 8, the threaded members 148 are rotated to be brought into desired pressure contact with the surface of the weapon K.

When it is desired to launch the weapon K the cartridges (not shown) in the cavity 160 are fired concurrently, with hot gas flowing therefrom through the passage 164, into the rearward portion of cylinder D-1. Piston C-1 has a transverse bore 234 therein in which a valve 232 is slidably supported that has an elongate cavity 236 therein that extends rearwardly from a forward end 238 of the valve. Cavity 236 is in communication with transverse bores 240. The second end portion 242 of the valve is closed as may be seen in FIG. 10, and is of enlarged transverse cross section to prevent the valve being moved forwardly to the extent it is inadvertently displaced from the piston C-1.

The first end portion 238 of the valve 232 has a resilient band 244 mounted thereon to prevent the valve being moved rearwardly relative to the piston C-1 to the extent it would be inadvertently disposed therefrom. During the time that the piston C-1 is being moved forwardly by the pressurized gas discharged into cylinder C-1, the valve 232 has the enlarged end portion 242 in contact with the piston C-1, and ports 240 being in the blocking position shown in FIG. 10 to prevent pressurized gas flowing into the interior of the piston C-1 forwardly of the piston.

When the piston C-1 approaches the end of the stroke in a forward direction, the first end 238 of the valve 232 contacts the end piece 22, with the piston thereafter continuing to move forwardly. Due to this forward movement of the piston C-1 relative to the valve 232, the ports 240 are placed in communication with the pressurized gas rearward of the piston C-1, with this pressurized gas flowing through the ports 240 and cavity 236 to discharge forwardly of the piston C-1 in the cylinder D-1. The rod B-1 has a section 246 that is rearwardly of the piston C-1 and of greater transverse cross section that the rod section 248 forwardly of the piston. Due to this difference in rod diameters, the piston C-1 has a rearward face 250 that is of less area than the forward face 252 of the piston. As a result of this difference in area in the sides of the piston C-1, the piston is subject to a greater force on the forward face 252 than the rearward face 250 upon completion of its forward stroke, and this increased force causing the piston and the rod B-1 to move rearwardly until the piston reaches the position shown in FIG. 8 whereupon the valve 232 is returned to the closed position shown in FIG. 10.

When pressurized gas discharges into the forward portion 204 of the cylinder D-1 as the piston C-1 completes its stroke, this pressurized gas discharges through the passage 202 back to the forward portion of the bore 174 as shown in FIG. 9. This discharging of pressurized gas into the forward portion of the bore 174 overcomes the gas pressure discharged into the bore rearwardly of the piston through the passage 174, and as a result the first and second members 176 and 184 are moved rearwardly as shown in FIG. 9 to cooperate with the spring 70 in returning the head 70 to the position shown in FIG. 4 where it results in the hooks 54 engaging the engageable member 48. After the engagement of the engageable member 48 as above described, rod B-1 is held in a stationary position relative to the housing 10.

After the rod B-1 has been returned to the position in which the hooks 54 are in engagement with the engageable members 48, the first and second arms H-1 and G-1 have been pivoted upwardly to the configuration illustrated in FIG. 8. After the aircraft has landed and it is again desired to load the form A-1 of the invention with a weapon K, the head 229 shown in FIG. 9 that rotates with the plate 224 is manually engaged by a suitable tool (not shown) to pivot the plate 224 in a counter clockwise direction. This rotation results in movement of the members 220, 208, 176 and 184 to pivot the lever 84 counter clockwise and separates the head 70 from contact with the rollers 60, which head and rollers are shown in FIG. 14. After the head 70 and rollers 60 have disengaged, the springs 56 will pivot the members 50 away from engagement with the engageable member 48 and the rod B-1 is now free to move forwardly, which rod movement is necessary if the sets of first and second arms H-1 and G-1 are to be pivoted downwardly from the position shown in FIG. 7 to that illustrated in FIG. 13 where the lugs 138 of a weapon K may be extended upwardly through the sway brace 120 to be engaged by the hooks 102.

The weapons K together with the sway brace 112 are moved upwardly together with the second end portions 36 of the second arms H-1, and as such upper movement takes place the members 100 pivot from the position shown in FIG. 12 to that illustrated in FIG. 13 and ultimately to the position shown in FIG. 7. Prior to the sway brace being moved upwardly to the position shown in FIG. 7, the members 146 illustrated in FIG. 7 are tightened to exert a desired pressure load on the weapon K supported on the sway brace 112. After a weapon K has been mounted on aircraft E by use of the first form A-1 of the invention, a safety pin 227 is extended through the aligned bores 228 to be certain that the invention will not launch the weapon K if inadvertently energized. Thus, the pin 227 must be of sufficient strength as to withstand the shearing force imposed thereon without breaking if the cartridges (not shown) are inadvertently fired when the aircraft is on the ground. The safety pins 227 are removed from the aligned bores 228 just prior to an aircraft carrying a weapon K on the first form of the invention A-1 taking off.

The second form of the weapon release system A-2 is shown in FIGS. 15 to 22 inclusive. The second form A-2 includes an elongate housing 230 that is defined by a pair of end pieces 232, pair of side pieces 234, top 236 and a bottom 238. The housing 230 is rigidly secured to an aircraft E by conventional means (not shown).

Second form A-2 includes major elements common to the first form A-1, and these elements are hereinafter identified by the same letters as previously used, but with the numeral 2 added thereto. The second form A-2 includes a rod B-2 that has a piston C-2 rigidly mounted thereon intermediate the ends of the rod. The rod B-2 and piston C-2 are slidably supported by a cylinder D-2, which cylinder is rigidly secured by brackets 240 to the interior of housing 230.

Figure 15:
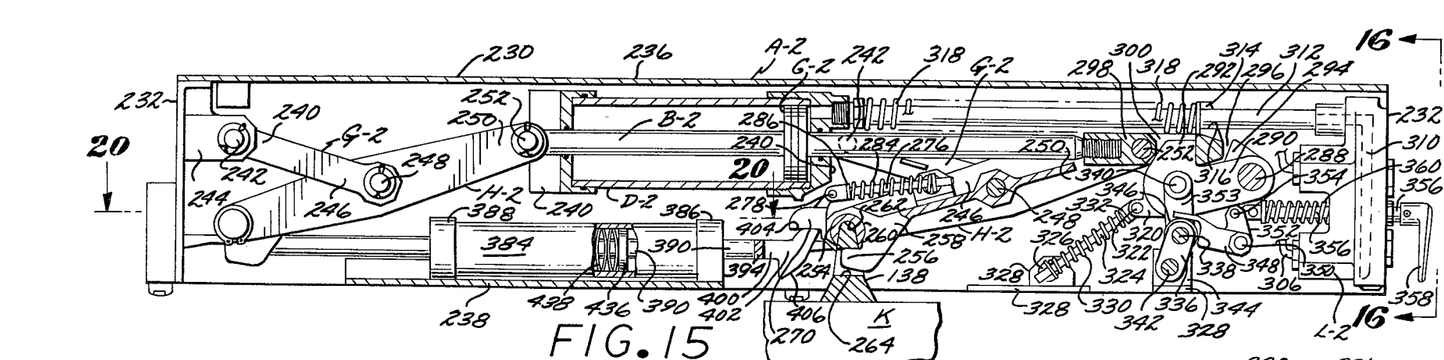
FIG. 15 is a longitudinal cross sectional view of a second form of the invention that is particularly adapted for use with launchable weapons having supporting lugs on 14 inch spacing.
Figures 16, 18:
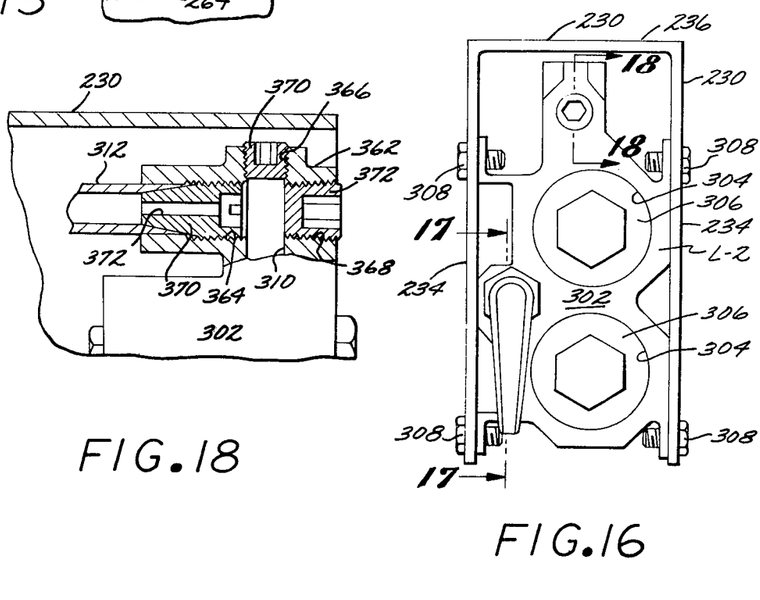
FIG. 16 is an end elevational view of the second form of the invention taken on the line 16—16 of FIG. 15.
FIG. 18 is a fragmentary cross sectional view of the second form of the invention taken on the line 18—18 of FIG. 16.

Second form A-2 includes two sets of first and second arms G-2 and H-2 as may be seen in FIG. 15. First means J-2 are included for removably engaging the lugs 138 of a weapon K. Pressurized gas for actuating the second form A-2 is from a controlled source L-2. A first end portion 240 of the most rearwardly disposed first arm G-2 is pivotally supported by a pin 242 that is mounted on a bracket 244. Bracket 244 is secured to the rearwardly disposed end piece 232. The second end portion 246 of each of the first arms G-2 is pivotally connected by a pin 248 to an intermediately disposed position on the most adjacently situated second arm H-2 as shown in FIG. 15. First end portions 250 of the second arms H-2 are pivotally connected by pins 252 to opposite end portions of the rod B-2.

The first means H-2 in the second form A-2 are first and second jaws 254 and 256 respectively, formed on the second end portions 258 of the second arms H-2, and the jaws 254 and 256 pivotally supporting a weapon lug retainer 260 therebetween. The retainer 260 is an elongate rigid cylinder as may be seen in FIG. 15 in which a longitudinal slot 262 is formed that is of such width and depth that the upper portion of a weapon lug 138 can be inserted therein. When the upper portion of the lug 138 is so disposed a transverse opening 264 in the lug can be engaged by the second jaw 256 of the second arm H-2 most adjacent thereto when the arm is in its outermost position. When a second arm G-2 pivots upwardly, the second jaw 256 remains in engagement with opening 264 to support the lug 138 and weapon K attached thereto from the second form A-2 of the weapon release. The first means J-2 on the rearwardly disposed second arm H-2 is the same as above described, but is not shown in complete structural detail in FIG. 15. The second form A-2 is particularly adapted for use on weapons K that have the supporting lugs 138 longitudinally spaced from one another by fourteen inches.

Figure 19:
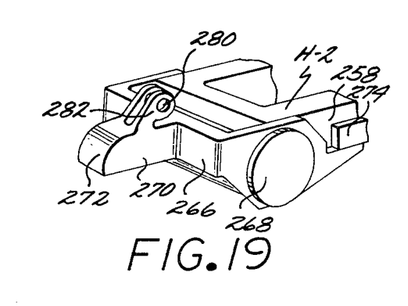
FIG. 19 is a perspective view of one of the components used in the second form of the invention.

In FIG. 19 it will be seen that a square U-shaped member 266 is pivotally supported by a transverse pin 268 from each second end portion 258 of each second arm H-2. Member 266 supports an outwardly projecting lug 270 that has an upper convex face 272. Two stops 274 are mounted on the sides of second end portions 258 that engage portions of the U-shaped member 266 when the latter has pivoted counter clockwise as viewed in FIG. 19 to that position shown therein. Each second end portion 258 has a rod 276 telescopically supported thereon that extends rearwardly to be pivotally connected to a transverse pin 278, which pin engages openings 280 formed in ears 282 that extend upwardly from the lug 270. Each rod 276 has a compressed helical spring 284 encircling the same, with the forward end of the spring abutting against a part of second end portion 258 as shown in FIG. 15, and the rearward end of the spring in abutting contact with a collar 286 secured to the rod. Each compressed helical spring 284 tends to maintain the lug 270 associated therewith in the position shown in FIG. 19 and the right hand side of FIG. 15.

In FIG. 15 it will be seen that a transverse shaft 299 is rotatably supported between sidepiece 234. Shaft 288 has a plate 290 secured thereto, which plate has first and second projections 292 and 294 formed as a part thereof that defines a space 296 therebetween. Rod B-2 has a head 298 secured thereto. Head 298 has an opening 300 therein that is engaged by first extension 292 when the second arms H-2 are in the uppermost weapon supporting position shown in FIG. 15.

Forward end piece 232 has a body 302 secured thereto in which a pair of cavities 304 are defined in which explosive cartridges (not shown) are disposed that generate high pressure gas when detonated by an electric charge through electrical conductors 306 shown in FIG. 15. The forward end portions of cavities 304 are closed by removable covers 306. Body 302 is held in a fixed position in housing 236 by screws 308 or other suitable fastening means. Passage means 310 for the high pressure gases extend from cavities 304 as shown in FIG. 15 to an elongate rigid tube 312 that extends from body 302 to the forward interior end portion of cylinder D-2. Head 298 has a lug 314 that has a bore 316 therein that slidably engages tube 312. A compressed helical spring 318 encircles tube 312 and has the ends thereof in abutting contact with lug 314 and the forward end of cylinder D-2.

Plate 290 includes a third projection 320 that by a pin 322 is pivotally connected to a downwardly and rearwardly extending rod 324 that has the rearward end portion slidably mounted in a transverse bore formed in a cylindrical body 326 rotatably supported between a pair of brackets 328 affixed to bottom 238. A tensioned helical spring 330 encircles rod 324 and is secured to body 326 and a collar 332 mounted on the rod as shown in FIG. 15. Spring 330 at all times tends to pivot plate 290 in a counter clockwise direction as viewed in FIG. 15. First and second links 334 and 336 at their adjoining end portions as shown in FIG. 15 are pivotally connected by a pin 338. First link 334 is pivotally connected by a pin 340 to plate 290. Second link 336 is pivotally connected by a pin 342 to a bracket 344 that is secured to bottom 328. Pin 338 rotatably supports a roller 346. Pins 334 and 336 when plate 290 is in the position shown in FIG. 15 bow forwardly slightly. Further forward bowing of links 334 and 336 is prevented by roller 346 contacting the rearward recessed end of a first arm 348 that is rigidly secured to a transverse shaft 350 that is rotatably supported between side pieces 234. A second arm 352 is secured to shaft 350 and extends upwardly therefrom. The outer end of second arm 352 as shown in FIG. 15 is supported by a pin 354 pivotally connected to the end of the rod 356 that is slidably supported in body 302. The forward end of rod 356 is provided with a handle 358.

A compressed helical spring 360 encircles rod 356 and at all times tends to pivot first arm 348 counter clockwise to maintain the same in contact with roller 346.

Tube 312 and passage 310 are joined at their junction by a fitting 362 that has first, second and third tapped bores 364, 366 and 368 therein. Bore 364 has a first plug 370 therein in which an orifice 372 is formed to control the rate of flow of gas resulting from the detonation of the cartridges or from other sources to the interior of cylinder D-1. Second and third bores are closed by second and third plugs 370 and 372.

Figure 17:
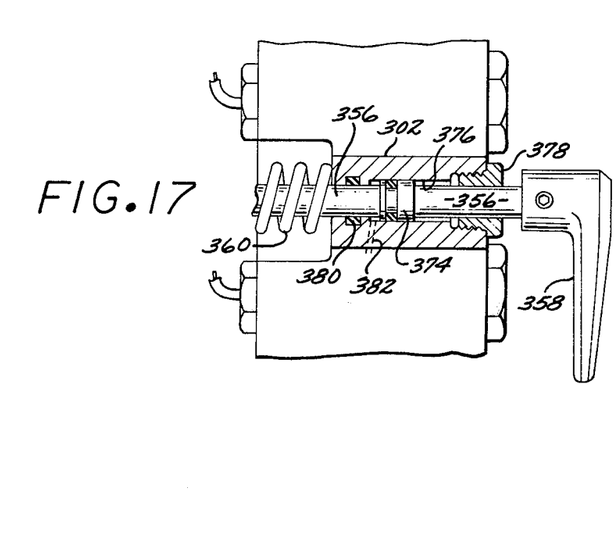
FIG. 17 is a fragmentary longitudinal cross sectional view of the second form of the invention taken on the line 17—17 of FIG. 16.

Rod 356 as shown in FIG. 17 has a piston 374 mounted thereon that is slidably movable in an elongate cylindrical shaped space 376 defined in body 302. The forward end of space 376 is sealed by an apertured plug 378 that slidably engages rod 356. The rearward end of space 376 is sealed by a resilient ring 380 that slidably engages rod 356. A passage 382 for high pressure gas extends from passage 310 to space 376 rearwardly of piston 374. When high pressure gas is generated by the cartridges (not shown) or other source L-2, rod 356 is moved forwardly and pivots arm 348 out of contact with roller 346.

Figure 20:
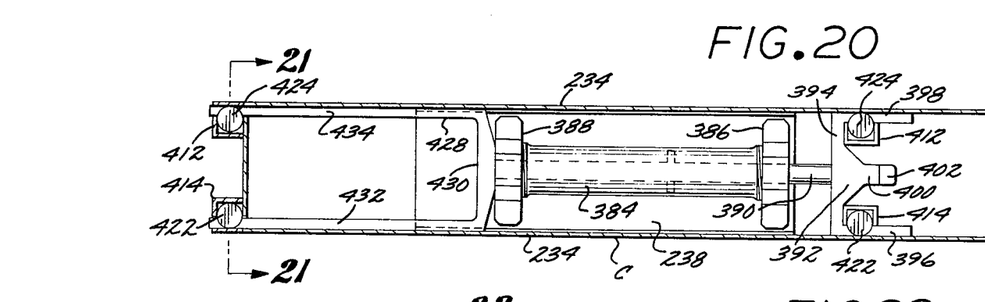
FIG. 20 is a fragmentary top plan view of a portion of the second form of the invention taken on the line 20—20 of FIG. 15.

Bottom 238 rigidly supports an elongate cylinder 384 that has forward and rearward end pieces 386 and 388 in which a rod 390 is slidably supported. The forward end of rod 390 is shown in FIG. 20. Rod 390 on the forward end end thereof supports an E shaped member 392 that includes a transverse web 394 from which first, second and third legs 396, 398 and 400 extend forwardly. A cam member 402 is supported from the forward end of the third leg 400, which cam member has a flat top 404 and a downwardly and rearwardly curing face 406. Cam member 402 is longitudinally aligned with lug 270.

Figure 22:
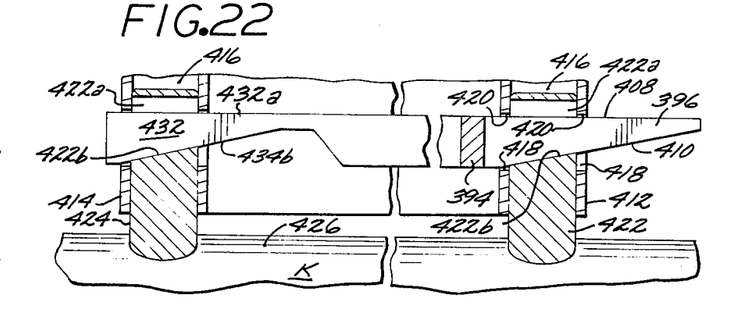
FIG. 22 is a fragmentary longitudinal cross sectional view of the second form of the invention taken on the line 22—22 of FIG. 21.

The first and second legs each have upper longitudinal edges 408 parallel to bottom 234, and lower longitudinal edges 410 that slope upwardly and forwardly as shown in FIG. 22. Bottom 238 supports first and second laterally spaced sets of identical frames 412 and 414 as shown in FIG. 20 that define vertically extending spaces 416 within the confines thereof. Both the sets of first and second frames 412 have pairs of vertical slots 418 therein that have upper horizontal edges 420 best seen in FIG. 22.

Figure 21:
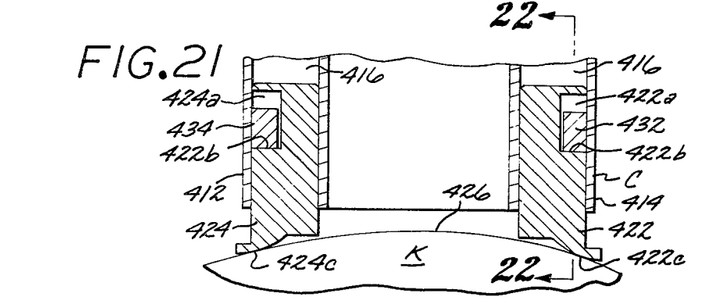
FIG. 21 is a fragmentary transverse cross sectional view taken on the line 21—21 of FIG. 20.

Two weapon K first and second preloading members 422 and 424 of the type shown in FIG. 21 are loosely mounted in the forwardly disposed frames 412 and 414 shown in FIG. 20. First and second members 422 and 424 have first and second transverse grooves 422a and 424a formed therein that are slidably engaged by the first and second legs 396 and 398 shown in FIGS. 20 and 22. The grooves 422a and 424a are partially defined by first and second lower upwardly and forwardly first and second cam faces 422b and 424b, which cam faces are slidably engaged by edges 410 as the first and second legs 396 and 398 are moved forwardly relative to the first and second frames 412 and 414. The first and second members 422 and 424 have lower angularly disposed surfaces 422c and 424c of the type that may be brought into desired preloading pressure with the curved exterior surface 426 as shown in FIG. 21.

Rod 390 has a U-shaped member 428 extending rearwardly therefrom, which member as may be seen in FIG. 20 is defined by a transverse web 430 from which first and second elongate legs 432 and 434 project. The first and second legs 432 and 434 have first and second upper horizontal edges 432a and 434a and lower first and second edges 432b and 434b that are angularly disposed as shown in FIGS. 21 and 22. When member 430 is moved forwardly, the rearwardly disposed first and second members 422 and 424 are moved downwardly into preloading contact with the weapon K.

Rod 390 has a piston 436 secured thereto, which piston is slidably disposed in cylinder 384. A number of Bellville washers 438 are mounted in cylinder 384 in encircling positions on rod 390 to exert a forwardly directed force on rod 390 as shown in FIG. 15.

When the cartridges (not shown) in cavities 306 are fired, high pressure gas flows through passage 310 shown in FIG. 15 and passage 382 illustrated in FIG. 17. The high pressure gas discharging through passage 382 moves rod 356 to the right as viewed in FIG. 17, with arm 348 being concurrently pivoted clockwise out of engagement with roller 346. Spring 330 now pivots plate 290 counter clockwise as viewed in FIG. 15 to disengage extension 292 from opening 300, and allow piston C-2 and rod B-2 to be driven to the left by high pressure gas entering cylinder D-2. Such movement of rod B-2 pivots the two sets of first and second arms G-2 and H-2 outwardly. At the outer most position of the second arms G-2 the first jaws 256 shown in FIG. 15 have moved out of the openings 264 in the supporting lugs 138 of weapon K, and the weapon is launched from the second form A-2 of the weapon release system. During this outward pivotal movement of the second arms G-2, the lugs 270 pivot clockwise to move by the cam member 402. At the outermost position of the second arms G-2 the arm 348 is resting on the top of roller 346.

After ejection of the weapon K, the helical spring 318 shown in FIG. 15 expands, and moves rod B-2 to the right as viewed in this figure. Second extension 294 of plate 290 is pressure contacted by head 298, with the plate pivoting clockwise to the position shown in FIG. 15. Compressed helical spring 360 now forces the arm 348 into the restraining position illustrated in FIG. 15 with roller 346. During this upward pivotal movement of second arms G-2 the lug 270 pressure contacts cam member 402 and forces the latter to the left against the force exerted by the Bellville washers 438. After lug 270 has moved upwardly above cam member 402, the Belleville washers force the cam member to the right to occupy the position shown in FIG. 15.

When it is desired to load a weapon K onto the second form A-2 of the invention, the handle 358 is moved outwardly to disengage arm 348 from roller 346. First and second arms G-2 and H-2 may now be pivoted to dispose the second arms in their outermost positions. Lugs 138 of weapon K now extend upwardly into slots 262 of retainers 260. The first and second sets of preloading members 422 and 424 are now resting on the exterior surface 426 of weapon K.

Second arm H-2 are now pivoted upwardly with the second jaws 256 moving into the openings 264 in weapon supporting lugs 138 to removably secure the weapon to the first form A-1 of the weapon release system.

After the lug 270 has moved upwardly past the cam member 270, the compressed Belleville springs 438 move the rod 390 and fingers 396, 398, 432, and 434 forwardly relative to the first and second sets of preload members 422 and 424 to force the latter into desired pressure contact with surface 426 of weapon K. Further upward pivotal movement of second arms H-2 results in the form A-2 being disposed in the weapon supporting system shown in FIG. 15.

Figure 23:
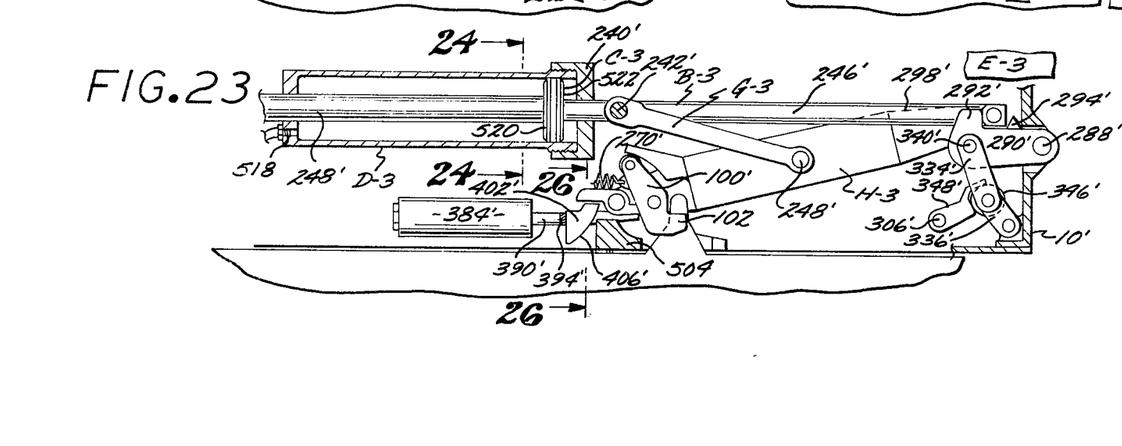
FIG. 23 is a combined side elevational and longitudinal cross sectional view of a third form of the invention that is particularly adapted for the support and release of launchable weapons having supporting lugs on at least thirty inch centers.
Figure 24:
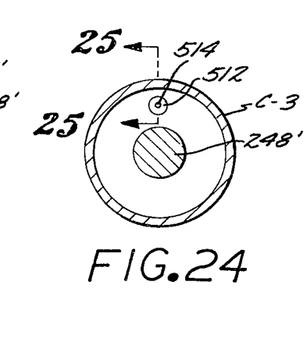
FIG. 24 is a transverse cross sectional view of a portion of the third form of the invention taken on the line 24—24 of FIG. 23.

The third form A-3 of the weapon release assembly shown in FIG. 23 is particularly adapted for use with weapons K having the supporting lugs 138 on thirty inch centers or greater. Major elements in third form A-3 are identified by the same letters used for like elements in FIG. 1 but with the numeral 3 added thereto. Portions of the elements used in third form A-3 are common to like elements previously described in connection with first and second forms A-1 and A-2. Such like elements are identified by the same numerals previously used but with primes added thereto.

Third form A-3 includes an elongate rod B-3 that has a piston C--3 affixed in an intermediate position thereon, and the rod B-3 and piston C-3 being slidably supported in an elongate cylinder D-3 that is secured to a housing 10' by conventional means (not shown). Housing 10' in turn is secured to aircraft E-3 by conventional means (not shown).

Third form A-3 includes a set of first and second arms G-3 and H-3 forwardly of cylinder and a like set of first and second arms G-3 and H-3 rearwardly of cylinder D-3. The forward and rearward sets of first and second arms G-3 and H-3 are pivotally connected to the housing 10, to one another, and to the rod B-3 in the same manner as the forward and rearward sets of first and second arms G-2 and H-2 are connected as shown in FIG. 15. The cylinder 384', rod 390', web 394' and the cam member 492 cooperate with the lug 270' in the same manner as previously described in connection with the second form A-2 of the invention, and as they so cooperate legs 500 shown in FIGS. 26 and 27 that have cam edges 502 are moved longitudinally relative to a sway brace 504 secured to aircraft E-3. The sway brace 504 has a concave lower surface 506 against which an upper portion of the external surface of a weapon K is adjacently disposed when the weapon is supported by the hooks 102' of member 100'.

Figure 26:
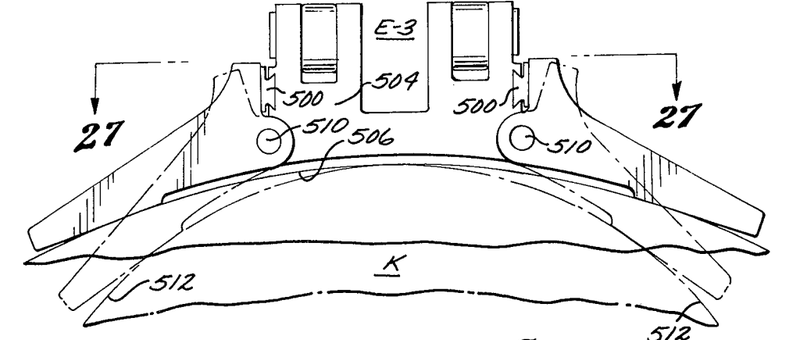
FIG. 26 is a transverse cross sectional view of the third form of the invention taken on the line 26—26 of FIG. 23.
Figure 27:
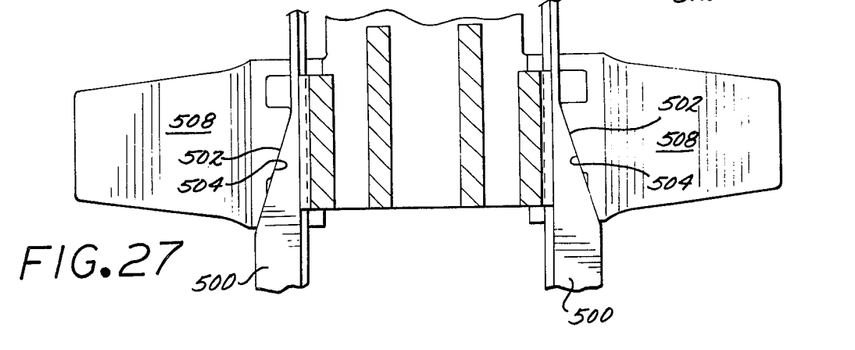
FIG. 27 is a combined longitudinal cross sectional and top plan view of a portion of the third form of the invention taken on the line 27—27 of FIG. 26.

As the legs 500 are moved longitudinally in the same manner as the legs 396 and 432 previously mentioned in connection with the form A-2 of the invention, the cam edges 502 engage associated edges 506 of preloading wings 508. As slidable movement takes place the cam edges 502 and 504 as shown in FIGS. 26 and 27, the wings 508 that are pivotally supported by pins 510 from sway brace 504 are pivoted downwardly to be forced into contact with the external surface 512 of the weapon K as can be seen in FIG. 26. This contact takes place irrespective of the radius of curvature of the external surface 512. When the wings 508 are in pressure contact with the weapon K, the weapon is preloaded into the sway brace 504. The magnitude of the pressure contact is determined by the magnitude of the force exerted by the Belleville springs 438 shown in FIG. 15, which when compressed exert a forwardly directed force on the web 434' shown in FIG. 23.

Figure 25:
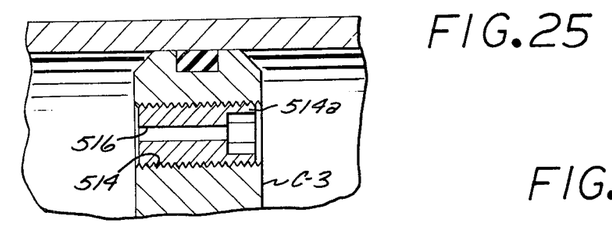
FIG. 25 is a fragmentary longitudinal cross sectional view of a portion of the third form of the invention and illustrating the apertured piston used therein.

The piston C-3 shown in FIGS. 23 and 25 has a transverse tapped bore 514 therein that is engaged by an externally threaded plug 514 that has a longitudinal orifice 516 formed thereon. In FIG. 23 it will be seen that pressurized fluid is directed into the cylinder D--3 through an opening 518 formed in the rearward portion thereof as shown in FIG. 23, and the pressurized fluid flowing through the orifice 516 to exert pressure on both the trailing face 520 and leading face 522 of the piston C-3. The rod section 246' of the piston B-3 forwardly of piston C-3 is smaller in transverse cross section than the rearward disposed section 248', and as a result the area of the leading face 522 is larger than the area of the trailing face 520. The gas discharged into the cylinder D-3 exerts unequal oppositely directed longitudinal forces on the faces 520 and 522 of the piston C-3, and as a result the pressure on the pressurized fluid entering the cylinder D-3 is buffered to an effective pressure of such magnitude as to cause a desired force to be exerted on the rod B--3. Due to this buffering and the inertia involved in accelerating the weapon K to move from a stationary position adjacent the aircraft E-3 to one of a desired velocity as it is ejected from the third form A-3 of the invention, the particular weight of the weapon K is of no importance in determining the velocity with which it will be ejected. Thus, if the weapon K is relatively light, the piston C-3 will tend to move forwardly in cylinder D-3 at a high velocity, but this is immediately countered by a build up of pressurized fluid in the forward portion of the cylinder to counter this action. If the weapon K is relatively heavy the acceleration of movement of piston C-3 is slower. However, in both instances the difference in forces exerted on the leading face 522 and trailing face 520 of the piston C--3 is such that the arms H-3 move outwardly at substantially the same velocity irrespective of the weight of the weapon K supported thereon, and weapons K of varying weights are accordingly discharged from the third form A-3 of the invention at the same desired terminal velocity.

Figure 28:
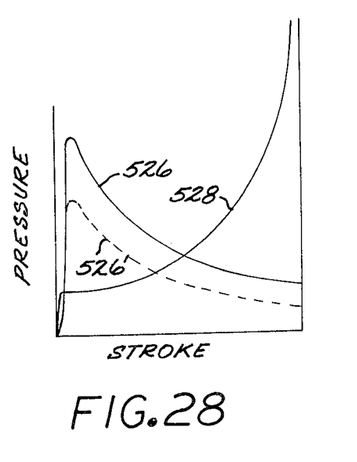
FIG. 28 is a set of curves that relate to the operation of the first, second and third forms of the invention.
Figure 29:
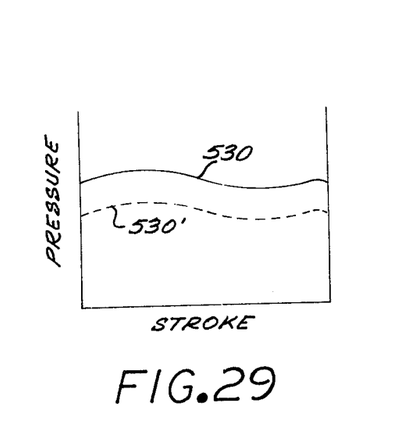
FIG. 29 is a second set of curves also relating to the operation of the first, second and third forms of the invention.

In FIG. 28 a typical curve 526 is depicted that is the standard ballistic isothermal pressure curve of a hot pressurized gas plotted against a horizontal axis that represents the stroke, and a vertical axis that represents the magnitude of the pressure of the gas relative the stroke. Also shown in FIG. 28 is a second curve 528 that represents the mechanical advantages of the force transmitted to the second arms H-1, H-2 and H-3 of the three forms of the invention when the pistons C-1, C-2 and C-3 are subjected to pressure. By buffering the pressure of the gas as described in connection with the third form A-3 of the invention, the curve 526 may be lowered to a curve 526' also shown in FIG. 28. The power output curve 530 is shown in FIG. 29 which is also plotted against pressure and stroke, and it will be seen that by adjusting the two curves 526 and 528 a substantial constant power output stroke 530 is obtained as well as a substantially flat output curve 530' when the buffered pressurized fluid concept is used in the invention.

Thus, it will be seen that by the use of the inventions previously described the weapon K can be discharged from a supporting aircraft E at a desired velocity by the articulately associated first and second arms G and H and this velocity being independent of the weight of the weapon K. Although the source of high pressure fluid has been described as explosive cartridges, it will be apparent that containers of high pressure gas, such as nitrogen, may be used equally well.

The use and operation of the invention has been described previously in detail and need not be repeated.

I claim:

1. In combination with an aircraft having a longitudinal axis a pressurized fluid actuated device capable of sequentially occupying first and second positions, said device when initially in said first position supporting a weapon having a pair of longitudinally spaced lugs in which axially aligned openings are defined in a triaxially restrained first position relative to said aircraft, said device when it is power actuated moving to said second position and concurrently moving said weapon outwardly relative to said aircraft in a path normal to said longitudinal axis to a second position where said weapon is released at a desired velocity in a first direction normal to said longitudinal axis and said weapon when released having a velocity in a second direction parallel to said longitudinal axis that is the same as the velocity of said aircraft, with said pressurized fluid actuated device after moving to said second position automatically returning to said first position, and said pressurized fluid actuated device upon returning to said first position having all of the components thereof occupying the same spaced relationship relative to one another that they initially did when said device was initially in said first position, said device including:

a. an elongate rigid rod;

b. first means for slidably supporting said rod from said aircraft parallel to said longitudinal axis;

c. two longitudinally spaced sets of first and second arms, each of which arms has first and second end portions; said second end portions of said second arms having a lower camming surface of predetermined contour;

d. second means for pivotally supporting said first end portions of said first arms at fixed positions relative to said aircraft, pivotally connecting said second end portions to said first arms to said second arms intermediate said first and second end portions of the latter, pivotally connecting said first end portions of said second arms to longitudinally spaced positions on said rod, with said first and second arms in each of said sets of such relative lengths that said second end portions of said second arms move in a plane normal to said longitudinal axis when said rod is moved relative to said aircraft;

e. rotatable supporting means pivotally connected to said second end portions of said second arms and adapted to engage and disengage said lugs and said lower camming surface of said second end portions of said second arms responsive to pivotal movement of said second arms, wherein said lower camming surface provides restraint against release of said lugs when said device is in said restrained first position and disengagement of said rotatable supporting means from said lower camming surface provides release of said lugs when said device is in said second position;

f. releasable pressurized fluid means that cooperate with said rod to reciprocate the latter to move said device from said first to said second position where said weapon is released and then return said device to said first position; and    g. spring loaded spray brace means that automatically contact said weapon to hold said weapon in a triaxially restrained position when said rotatable supporting means are caused to engage said openings in said lugs and said device is in said first position.

2. A device as defined in claim 1 in which said rotatable supporting means are:

h. first and second laterally spaced jaws defined on each of said second end portions of said second arms; and i. a cylindrical retaining member rotatably supported between said first and second jaws, said retaining member having a longitudinal slot therein of such dimensions as to snugly engage the portion of said lug above said opening therein, with said second jaw engaging said opening in one of said lugs when the portion of said lug above said opening is in said slot, and said retainer and first and second jaws cooperating to support one of said lugs and said weapon of which it forms a part until said second end portion of one of said second arms has moved outwardly to said second position where the space between said first and second jaws and said slot are aligned and said lug is free to move therefrom and said weapon is released from said assembly.

3. A device as defined in claim 1 in which said spring loaded sway brace means includes:
  g. a plurality of longitudinally and laterally spaced frames that define a plurality of vertically extending spaces, said frames having longitudinally aligned pairs of openings therein and said frames supported in fixed positions relative said aircraft;
  h. a plurality of preloading elongate members movably mounted in said frames, with each of said members having a transverse cam defining slot therein that is axially aligned with one of said pair of openings;
  i. a plurality of elongate rigid legs slidably mounted in said pairs of openings, said legs having tapered edges that slidably engage the cams defined by said slots; and
  j. spring means that move said legs relative to said frames and cam defining slots after said second arms have pivoted to said first position, with said movement forcing said preloading members into pressure contact with the exterior surface of said weapon to hold the latter in triaxial restrain during the transportation thereof by said aircraft.

4. A device as defined in claim 1 in which said sway brace means includes:
  i. at least one sway brace supported from said aircraft and adjacently disposed to said weapon when said lugs of the latter are engaged by said rotatable supporting means;
  j. first means on said sway brace that may be moved into desired preloading contact with said weapon;
  k. second spring loaded means for forcing said first means into desired preloading contact with said weapon; and
  l. third means responsive to upward pivotal movement of said second arms to actuate said second means when said second move to said first position on said aircraft.

5. A device as defined in claim 4 in which said first means are a plurality of elongate spaced members that may be moved relative said sway brace.

6. A device as defined in claim 4 in which said first means are a plurality of spaced wings pivotally supported from said sway brace that may be pivoted into said preloading contact with the exterior surface of said weapon irrespective of the radius of curvature of the latter.

7. A device as defined in claim 1 in which said rotatable supporting means are:
  h. two spring loaded hooks pivotally supported from said second end portions of said second arms, which hooks when said second arms are in said first position and while said second arms are pivoting towards said second position engage said openings in said lugs to support said weapon from said second end portions of said second arms; and
  i. two cam surfaces defined on said second end portions of said second arms against which said hooks bear when said second arms are in said first position and as they move towards said second position, with said cam surfaces maintaining said hooks in engagement with said openings in said lugs until said second end portions of said second arms reach said second position whereupon said hooks are disengaged from said cam surfaces and the weight of said weapon pivots said hooks in a direction whereby said weapon separates from said hooks.

8. A device as defined in claim 7 in which said spring loaded sway brace means are:
  j. two elongate sway braces pivotally supported from said second end portions of said second arms in a first position and disposed in a plane parallel to said longitudinal axis, said sway braces having openings therein through which said lugs extend upwardly to be engaged by said hooks; and
  k. spring means that pivot said sway braces to extend longitudinally along said second arms in a second position after said second end portions of said second arms have moved to said second position, and said sway braces remaining in said second position as said second arms pivot and return to said first position.

9. A device as defined in claim 1 in which said spring loaded spray brace means are disposed in a fixed position on said aircraft.

10. In combination with an aircraft having a longitudinal axis a pressurized fluid actuated device capable of sequentially occupying first and second positions, said device when initially in said first position supporting a weapon having a pair of longitudinally spaced lugs in which axially aligned openings are defined in a triaxially restrained first position relative to said aircraft, said device when it is power actuated moving to said second position and concurrently moving said weapon outwardly relative to said aircraft in a path normal to said longitudinal axis to a second position where said weapon is released at a desired velocity in a first direction normal to said longitudinal axis and said weapon when released having a velocity in a second direction parallel to said longitudinal axis that is the same as the velocity of said aircraft, with said pressurized fluid actuated device after moving to said second position automatically returning to said first position, and said power actuated device upon returning to said first position having all of the components thereof occupying the same spaced relationship relative to one another that they initially did when said device was initially in said first position, said device including:
  a. an elongate rigid rod that includes first and second longitudinally aligned first and second portions, said first portion of greater transverse area than said first portion;
  b. first means for slidably supporting said rod from said aircraft;
  c. two longitudinally spaced sets of first and second arms, each of which arms has first and second end portions;
  d. second means for pivotally supporting said first end portions of said first arms at fixed positions relative said aircraft, pivotally connecting said second end portions of said first arms to said second arms intermediate said first and second end portions of the latter, pivotally connecting said first end portions of said second arms to longitudinally spaced positions on said rod, with said first and second arms in each of said sets of such relative lengths that said second end portions of said second arms move in a path substantially normal to the longitudinal axis of said rod when said rod is moved relative to said aircraft;

e. movable supporting means on said second end portion of said second arms that occupy first positions to engage said openings in said lugs to support said weapon in a transporting position from said aircraft and during the time said weapon is being moved outwardly relative to said aircraft to said desired position, said supporting means responsive to the pivotal end of said second arms and automatically moving to second positions out of engagement with said openings when said desired position is reached to release said weapon at said predetermined velocity;

f. releasable pressurized fluid means that cooperate with said rod to reciprocate the latter to move said device from said first to said second position where said weapon is released and then return said device to said first position, and said releasable pressurized fluid means including:

1. a piston mounted on said rod at the junction of said first and second portions, said piston having first and second oppositely disposed faces, said second face of greater area than said first face;

2. a cylinder having first and second ends, said cylinder supported in a fixed position relative to said aircraft, said piston slidably and sealingly movable in said cylinder, said piston subdividing the interior of said cylinder into said first and second confined spaces of variable volume;

3. a source of pressurized fluid;

4. first passage means connecting said source to said first compartment;

5. first manually operated means for discharging a quantity of said pressurized fluid from said source through said first passage means to said first compartment to exert a force on said first face of said piston that moves said piston towards said second end of said cylinder, with said first and second sets of legs pivoting outwardly relative to said aircraft to move said weapon towards said second position; and 6. a slide valve on said piston that in a first position obstructs communication between said first and second compartments, said slide valve after said first and second sets of legs and said weapon having reached said second position striking said second end of said cylinder and assuming a second position where communication is established between said first and second compartments, with pressurized fluid from said first compartment flowing through said slide valve when the latter is in said second position into said second compartment to move said piston and rod towards said first end due to the differential in areas of said first and second faces, said first and second sets of lets as said piston and rod move towards said first end of said cylinder pivoting from said second position towards said first position, and said first and second sets of legs being fully disposed in said first position when said piston and rod have moved towards said first end to the extent that said slide valve contacts said first end and moves to said first position; and g. spring loaded spray brace means that automatically contact said weapon to hold said weapon in a triaxially restrained position when said rotatable supporting means are caused to engage said openings in said lugs and said device is in said first position.

11. A device as defined in claim 10 which in addition includes:

n. third means that is spring loaded and is capable of occupying either a first or a second position, said third means when in said first position engaging said rod to prevent movement thereof relative to said aircraft and maintain said first and second sets of arms and said weapon in said first position, said third means being responsive to said pressurized fluid to move from said first to said second position, and from said second to said first position;

o. second passage means in communication with said first passage means to discharge pressurized fluid to said third means to move the latter from said first to said second position where said third means is not in engagement with said rod, and said rod being free to move relative to said aircraft to pivot said first and second sets of arms and said weapon from said first to said second position; and p. third passage means in communication with said second compartment and said third means for discharging pressurized fluid to said third means to allow said third means to return to said first position to engage said rod as said piston approaches said first end of said cylinder.

* * * * *